United States Patent
Yaqoob et al.

(10) Patent No.: US 12,197,929 B2
(45) Date of Patent: Jan. 14, 2025

(54) SYSTEMS AND METHODS FOR SEQUENTIAL MODEL FRAMEWORK FOR NEXT-BEST USER STATE

(71) Applicant: Walmart Apollo, LLC, Bentonville, AR (US)

(72) Inventors: Ali Arsalan Yaqoob, Union City, CA (US); Yue Xu, San Francisco, CA (US); Hyun Duk Cho, San Francisco, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/148,254

(22) Filed: Dec. 29, 2022

(65) Prior Publication Data

US 2024/0220286 A1    Jul. 4, 2024

(51) Int. Cl.
*G06F 9/451*    (2018.01)
*G06N 3/08*    (2023.01)

(52) U.S. Cl.
CPC ............. *G06F 9/451* (2018.02); *G06N 3/08* (2013.01)

(58) Field of Classification Search
CPC ................... G06F 9/451; G06N 3/08
See application file for complete search history.

(56) References Cited

U.S. PATENT DOCUMENTS

| 10,360,610 | B2 | 7/2019 | Vijayaraghavan et al. |
| 10,977,058 | B2 * | 4/2021 | Berg .................. G06F 9/45512 |
| 11,210,712 | B2 | 12/2021 | Zhang et al. |
| 11,886,965 | B1 * | 1/2024 | Schwartz .............. G06N 20/00 |
| 2019/0311279 | A1 * | 10/2019 | Sinha ..................... G06F 17/11 |
| 2021/0233150 | A1 | 7/2021 | Korpeoglu et al. |

(Continued)

FOREIGN PATENT DOCUMENTS

CN        112381186 A        2/2021

OTHER PUBLICATIONS

G. Khanna, et al., "Method for Embedding Customers' Sequential Actions for Hyper-Personalised Recommendations," The IP.com Journal, Feb. 14, 2022, 3 pages.

(Continued)

*Primary Examiner* — Beau D Spratt
(74) *Attorney, Agent, or Firm* — Morgan, Lewis & Bockius LLP; Manita Rawat

(57) ABSTRACT

Systems and methods of generating an interface including elements related to a next best state prediction are disclosed. A request for an interface including a user identifier is received. A next state prediction engine receives a sequence unit set including at least one sequence unit associated with the user identifier and a set of features associated with the at least one sequence unit and generates at least one next state prediction using a trained sequential prediction model. The trained sequential prediction model is configured to receive the sequence unit set and the set of features for the at least one sequence unit and output at least one predicted next state for the sequence unit set. An interface generation engine generates an interface including at least one element related to the at least one predicted next state and transmits the interface to a user device associated with the user identifier.

17 Claims, 14 Drawing Sheets

(56) References Cited

U.S. PATENT DOCUMENTS

| | | | |
|---|---|---|---|
| 2021/0365965 A1* | 11/2021 | Shrivastava | G06N 3/088 |
| 2022/0058714 A1* | 2/2022 | Chen | G06N 3/084 |
| 2022/0108680 A1* | 4/2022 | Zhang | G10L 13/10 |
| 2022/0254459 A1* | 8/2022 | Huang | G16H 10/60 |
| 2022/0286263 A1* | 9/2022 | Qin | G06N 7/01 |
| 2022/0414432 A1* | 12/2022 | Banitalebi Dehkordi | G06N 3/048 |
| 2023/0207064 A1* | 6/2023 | Hamp | G06N 3/084 706/12 |
| 2023/0409956 A1* | 12/2023 | El Hattami | G06N 20/00 |

OTHER PUBLICATIONS

Resulticks Solution Inc., "Next-best action," 2022, 3 pages.
C. H. Park et al., "A multi-category customer base analysis," International Journal of Research in Marketing, vol. 31, Issue 3, Sep. 2014, pp. 266-279.
S.Chib et al., "Analysis of Multi-Category Purchase Incidence Decisions Using IRI Market Basket Data," Econometric Models in Marketing, vol. 16, 2002, pp. 55-90.
G. Khanna et al., "Method to Cross-Sell Digital Goods to Existing Physical Goods Buyers on Online Marketplaces," The IP.com Journal, Feb. 2, 2022, 2 pages.

\* cited by examiner

SYSTEMS AND METHODS FOR SEQUENTIAL MODEL FRAMEWORK FOR NEXT-BEST USER STATE

TECHNICAL FIELD

This application relates generally to interface generation, and more particularly, to next-best state prediction for network interfaces.

BACKGROUND

When interacting with computer interfaces, such as network environment interfaces, a user can be in one of several states and can potentially enter into one of several other states. A state can include a current interaction with a network interface, such as an interaction with a website interface, an underlying asset that is part of an interaction, such as items identified for inclusion in a grouping, timing-based states, etc.

The nature of a user state when interacting with a computer interface is flexible. Current interfaces require users to navigate various interface elements to select appropriate transitions to move to their next desired state. It may not be readily apparent how a user can transition to the desired state within the interface or, alternatively, a user may not clearly understand their desired next state. Current interfaces fail to capture likely state transitions within interface components and cannot provide personalized interfaces that anticipate user actions.

SUMMARY

In various embodiments, a system is disclosed. The system includes a non-transitory memory and a transceiver configured to receive a request for an interface including a user identifier. The user identifier is stored in the non-transitory memory. A next state prediction engine is configured to receive a sequence unit set including at least one sequence unit associated with the user identifier, wherein the sequence unit is stored in the non-transitory memory, receive a set of features associated with the at least one sequence unit in the sequence unit set, and generate at least one next state prediction using a trained sequential prediction model, wherein the trained sequential prediction model is configured to receive the sequence unit set and the set of features for the at least one sequence unit and output at least one predicted next state for the sequence unit set. An interface generation engine is configured to generate an interface including at least one element related to the at least one predicted next state and transmit the interface to a user device associated with the user identifier.

In various embodiments, a computer-implemented method is disclosed. The computer-implemented method includes steps of receiving, via a transceiver, a request for an interface including a user identifier, wherein the user identifier is stored in non-transitory memory, receiving, by a state prediction engine, a sequence unit set including at least one sequence unit associated with the user identifier, wherein the sequence unit is stored in the non-transitory memory, receiving, by the state prediction engine, a set of features associated with the at least one sequence unit in the sequence unit set, and generating, by the state prediction engine, at least one next state prediction using a trained sequential prediction model. The trained sequential prediction model is configured to receive the sequence unit set and the set of features for the at least one sequence unit and output at least one predicted next state for the sequence unit set. The computer-implemented method further includes steps of generating, by an interface generation engine, an interface including at least one element related to the at least one predicted next state and transmitting, via the transceiver, the interface to a user device associated with the user identifier.

In various embodiments, a method of training a sequential prediction model is disclosed. The method includes a step of receiving a set of training data including a plurality of sequence unit sets and a plurality of feature sets. Each feature set in the plurality of feature sets is associated with a sequence unit set in the plurality of sequence unit sets. The method further includes steps of iteratively modifying one or more parameters of a sequential prediction model to minimize a predetermined cost function and outputting a trained sequence prediction model configured to receive a current sequence unit set and a plurality of features related to the current sequence unit set and output a next predicted state.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
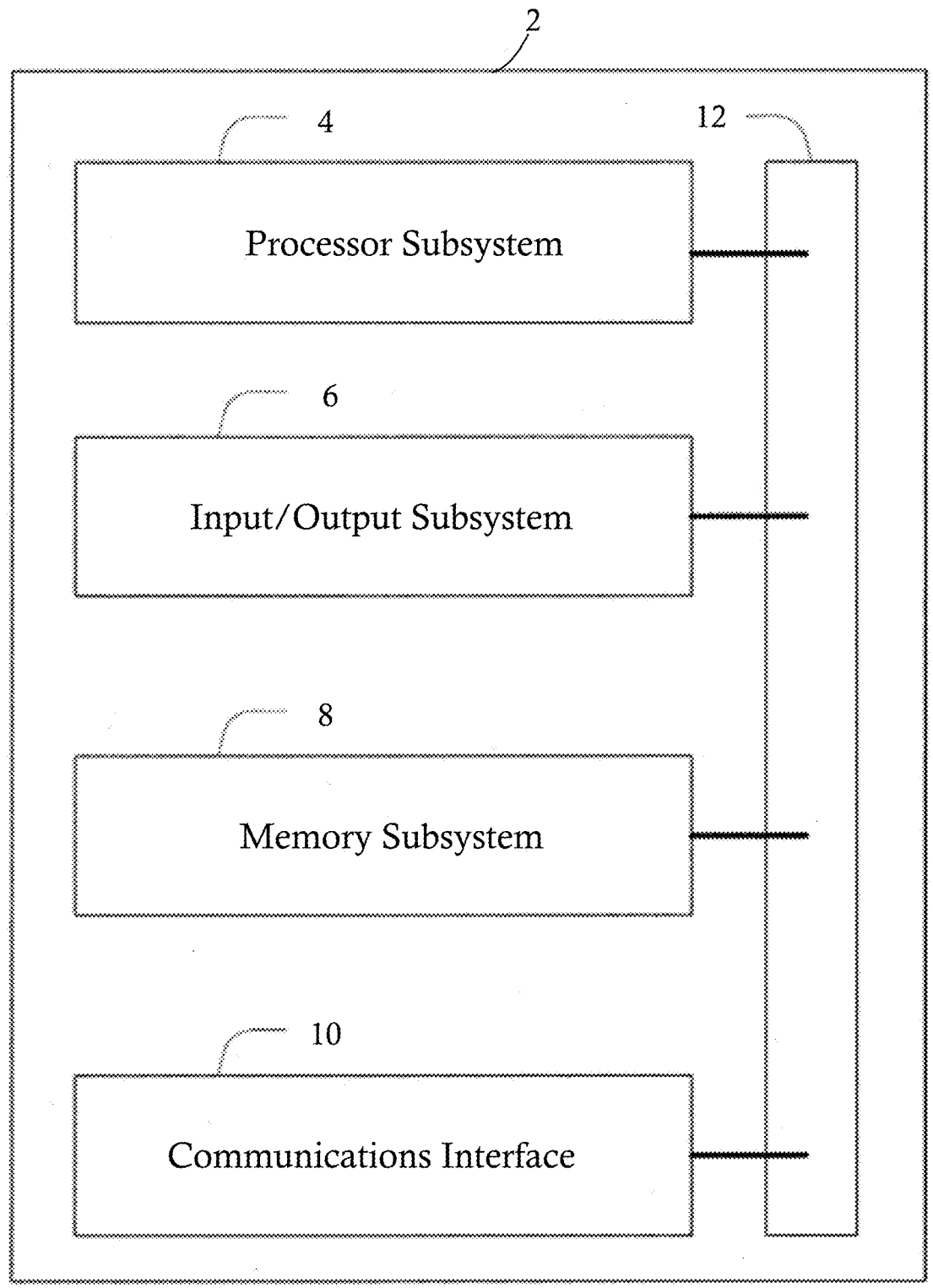
FIG. 1 illustrates a computer system configured to implement one or more processes, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for implementing a network interface including a sequential prediction engine for next-best state prediction. In various embodiments, a sequential prediction engine is configured to receive a sequence unit input representative of a current or past state and a set of feature inputs related to the sequence unit. The sequential prediction engine is configured to generate an output including one or more next-best (e.g., next most-likely) states. The sequential prediction engine can be integrated into a network environment and can be configured to provide next-best state predictions for one or more network components, such as an interface generation engine configured to generate a user interface.

In some embodiments, a sequential prediction engine includes one or more trained sequential prediction models configured to generate next state predictions based on a sequence unit input and a set of input feature. For example, in some embodiments, one or more sequential prediction models are configured to receive a sequence unit, $S_i$, representative of a time step state, and set of features $F_i$ that are related to and/or associated with the sequence unit at the current time step state.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network, or a convolutional deep neural network. Furthermore, a neural network can be an adversarial network, a deep adversarial network and/or a generative adversarial network.

In various embodiments, a system including one or more neural networks trained (e.g., configured or adapted) to generate next state predictions, is disclosed. A neural network trained to generate next state predictions may be referred to as a trained sequential prediction network and/or a trained sequential prediction model. A trained sequential prediction model can be configured to generate one or more state predictions for a next likely user state, in accordance with some embodiments. The next state predictions predict a next state for a user engaging with a computer interface. The predicted states can include user intents, interface elements, potential user actions, and/or other suitable state transitions. Although embodiments are discussed herein in the context of an e-commerce environment, it will be appreciated that the disclosed systems and methods can be utilized to predict next-best states for any suitable network environment.

FIG. 1 illustrates a computer system configured to implement one or more processes, in accordance with some embodiments. The system 2 is a representative device and can include a processor subsystem 4, an input/output subsystem 6, a memory subsystem 8, a communications interface 10, and a system bus 12. In some embodiments, one or more than one of the system 2 components can be combined or omitted such as, for example, not including an input/output subsystem 6. In some embodiments, the system 2 can include other components not combined or comprised in those shown in FIG. 1. For example, the system 2 can also include, for example, a power subsystem. In other embodiments, the system 2 can include several instances of the components shown in FIG. 1. For example, the system 2 can include multiple memory subsystems 8. For the sake of conciseness and clarity, and not limitation, one of each of the components is shown in FIG. 1.

The processor subsystem 4 can include any processing circuitry operative to control the operations and performance of the system 2. In various aspects, the processor subsystem 4 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also can be implemented by a controller, a microcontroller, an application specific integrated circuit (ASIC), a field programmable gate array (FPGA), a programmable logic device (PLD), and so forth.

In various aspects, the processor subsystem 4 can be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 can include a system bus 12 that couples various system components including the processor subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 6 can include any suitable mechanism or component to enable a user to provide input to system 2 and the system 2 to provide output to the user. For example, the input/output subsystem 6 can include any suitable input mechanism, including but not limited to, a button, keypad, keyboard, click wheel, touch screen, motion sensor, microphone, camera, etc.

In some embodiments, the input/output subsystem 6 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 2. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 4. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 can include any suitable hardware, software, or combination of hardware and software that is capable of coupling the system 2 to one or more networks and/or additional devices. The communications interface 10 can be arranged to operate with any suitable technique for controlling information signals using a desired set of communications protocols, services, or operating procedures. The communications interface 10 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 can include a wireless interface comprising one or more antennas, transmitters, receivers, transceivers, amplifiers, filters, control logic, and so forth.

In various aspects, the communications interface 10 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac/ax/be, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, the Wi-Fi series of protocols including Wi-Fi Legacy, Wi-Fi 1/2/3/4/5/6/6E, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electromagnetic induction (EMI) techniques. An example of EMI techniques can include passive or active radio-frequency identification (RFID) protocols and devices. Other suitable protocols can include Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 can include any machine-readable or computer-readable media capable of storing data, including both volatile/non-volatile memory and removable/non-removable memory. The memory subsystem 8 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 2.

In various aspects, the memory subsystem 8 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 can contain an instruction set, in the form of a file for executing various methods, such as methods for generating a network interface including one or more predicted states generated by a sequential prediction engine, as described herein. The instruction set can be stored in any acceptable form of machine-readable instructions, including source code or various appropriate programming languages. Some examples of programming languages that can be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor subsystem 4.

Figure 2:
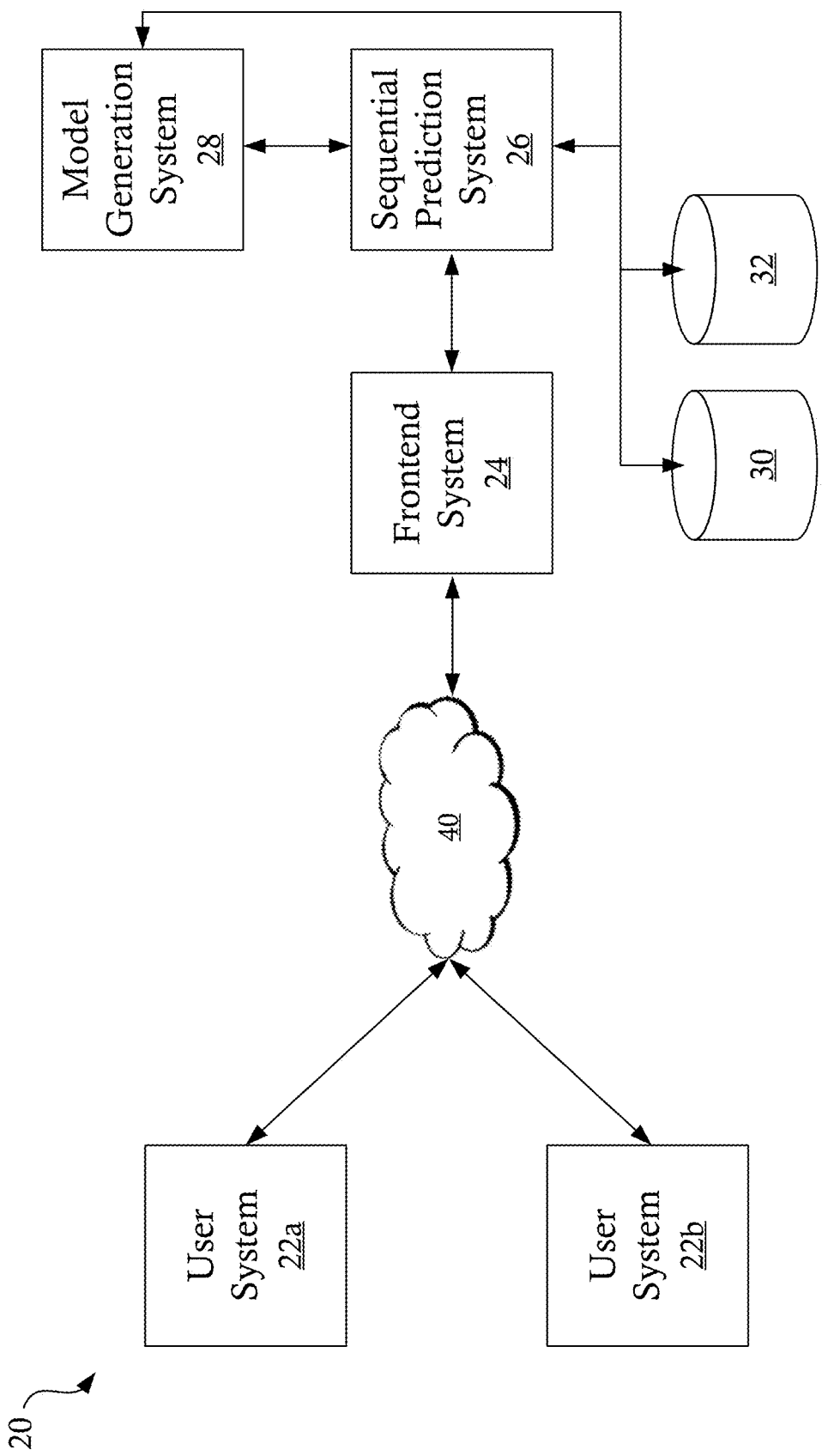
FIG. 2 illustrates a network environment configured to provide a network interface including one or more states selected by a sequential prediction engine, in accordance with some embodiments.

FIG. 2 illustrates a network environment 20 configured to provide a network interface including one or more states (e.g., interfaces, assets, etc.) selected by a sequential prediction engine, in accordance with some embodiments. The network environment 20 includes a plurality of systems configured to communicate over one or more network channels, illustrated as network cloud 40. For example, in various embodiments, the network environment 20 can include, but is not limited to, one or more user systems 22a-22b in signal communication with a frontend system 24. The frontend system 24 can be configured to provide a customized interface, including one or more portions representative of a next-best state, to each of the one or more user systems 22a-22b.

The customized interface can include any suitable interface. For example, in some embodiments, the customized interface can include an e-commerce interface, a service interface, an intranet interface, and/or any other suitable user interface. In some embodiments, the customized interface includes a webpage, web portal, intranet page, and/or other interactive page generated by the frontend system 24. In some embodiments, the customized interface includes one or more state transitions selected by a sequential prediction engine configured to implement a next-state prediction model. The sequential prediction engine and/or the next-state prediction model can be implemented by any suitable system, such as, for example, a sequential prediction system 26.

In some embodiments, a sequential prediction system 26 implements a sequential prediction engine configured to generate next-state prediction for a networking interface. The sequential prediction engine is configured to capture both historical and changing user preferences to predict the next most likely state for a user interacting with a network interface. Each "state" prediction can be configured to present one or more interface elements related to a most likely interaction between a user and an interface. For example, in various embodiments, the sequential prediction engine can be configured to predict an interface page of the network interface for a user given the user's current state and various input features. As another example, in some embodiments, a sequential prediction engine can be configured to predict one or more items in an e-commerce catalog that a user is likely to select for purchase. As yet another example, in some embodiments, a sequential prediction engine can be configured to predict a theme, e.g., a holiday or date-related theme, for presentation to a user that can include specific items, interface pages, etc. It will be appreciated that any suitable state can be predicted by the sequential prediction engine.

In some embodiments, the sequential prediction engine includes one or more sequential models configured to generate a next-state prediction. Each of the sequential models are configured to receive a set of inputs including a current state input, $S_i$, and a set of features, $F_i$. The set of features $F_i$ can include any suitable set of features for generating a next-best state prediction. For example, the set of features $F_i$ can include, but is not limited to, meta features associated with a sequence at a time step. Each of the sequential models can include a predetermined framework trained using a set of features related to the state prediction. For example, in various embodiments, each of the sequential models can be configured to implement a self-attentive sequential recommendation (SASRec) framework, a Time-aware self-attentive sequential recommendation (TiSASRec) framework, and/or any other suitable framework.

The current state input can represent any suitable current state and/or any property of a state. For example, in various embodiments, the current state input $S_i$ can represent an interaction with a network interface such as an e-commerce interaction (e.g., placing an order, adding an item to cart, searching for items, returning items, etc.), a loyalty program interaction (e.g., signing up for a loyalty program, renewing a loyalty program, etc.), product or item that is being interacted with (e.g., added to cart, viewed, searched for, etc.), a transaction, a customer state, time periods (e.g., day of week, month of year, holidays, etc.), and/or any other suitable state. In some embodiments, the current state input is a sequence-unit $S_i$ representing the current state at time i. The sequence unit $S_i$ can include, but is not limited to, item or item properties, transaction or transaction properties, customer or customer properties, specific features such as an activity type (e.g., add to cart, clock on, item view, etc.), and/or any other suitable property.

In some embodiments, the sequential prediction system 26 is in communication with one or more databases 30. The database 30 can be configured to store sets of features related to various state predictions. For example, in various embodiments, one or more databases 30 can be configured to store feature sets related to current states, user features, and/or any other suitable features for generating a state prediction. The databases 30 can further be configured to store one or more trained sequential prediction models for execution by a sequential prediction engine and/or assets (e.g., templates, content elements, etc.) for inclusion in a generated user interface.

In some embodiments, the network environment 20 includes a model training system 28 configured to generate one or more trained sequential prediction models. For example, the model training system 28 can include a model training engine configured to implement an iterative training process, as discussed in greater detail below, to generate the sequential prediction model(s). In some embodiments, the model training engine is configured to generate state-type sequential prediction models. For example, in some embodiments, a model training engine is configured to generate one or more sequential prediction models for each of a defined state type, such as an interface page state, an item state, a customer state, etc. A state-specific sequential prediction model can be generated by providing a state-specific training data set to a training process. State-specific training data can include, but is not limited to, state sequences and meta features related to each of the states in a state sequence. The one or more generated sequential prediction models can be provided to a sequential prediction system 26 for implementation, e.g., prediction of next best state as part of an interface generation process.

In some embodiments, the model training system 28 is configured to obtain training data sets, such as sets of sequence units and/or sets of features associated with one or more sequence units, from a database 32. In some embodiments, the model training system 28 is configured to receive one or more identifiers, such as a user identifier or sequence identifier, as part of training data set. Each of the identifiers can be used to retrieve a set of features and/or a sequence set associated with the identifier.

In various embodiments, the system or components thereof can comprise or include various modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the examples herein.

Figure 3:
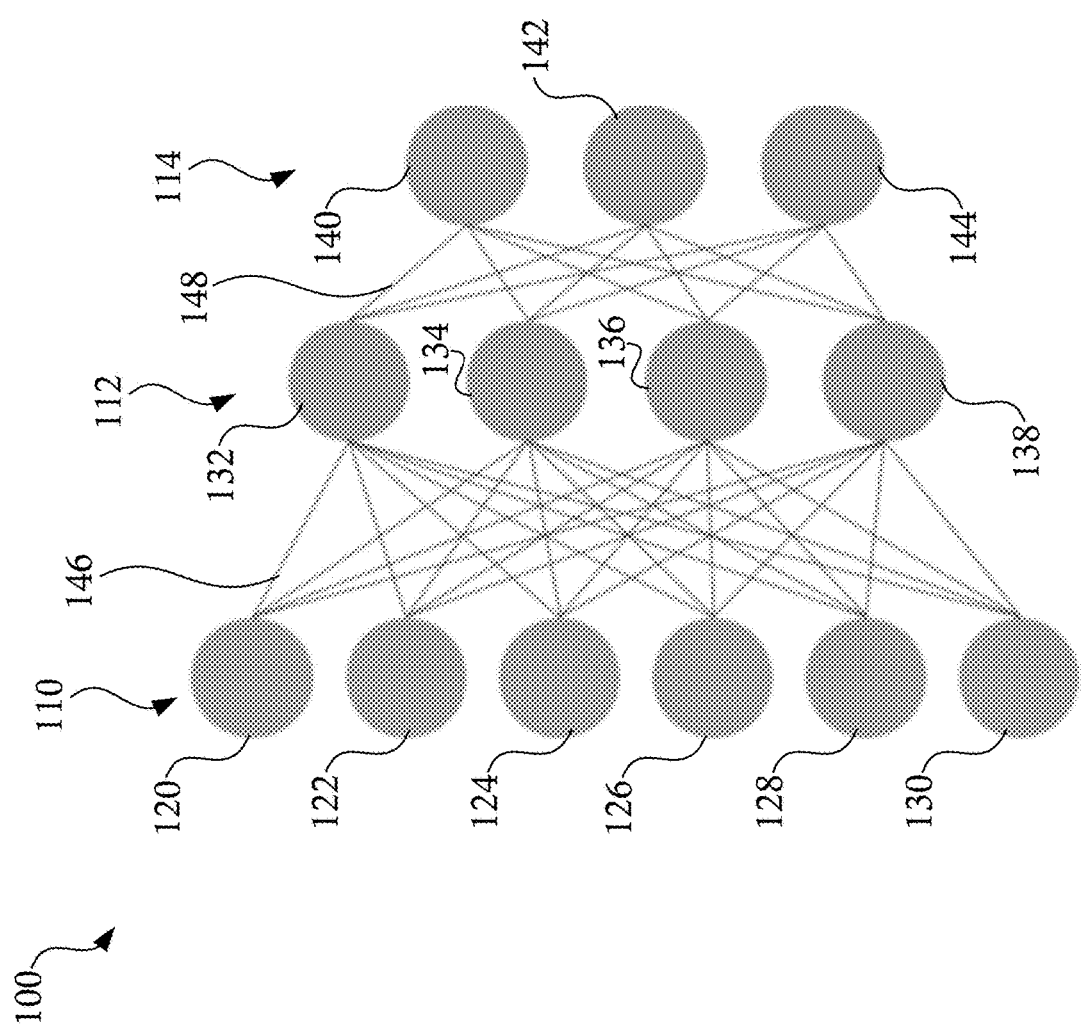
FIG. 3 illustrates an artificial neural network, in accordance with some embodiments.

FIG. 3 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 can be arranged in layers 110-114, wherein the layers can comprise an intrinsic order introduced by the edges 146-148 between the nodes 120-144. In particular, edges 146-148 can exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 can be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number can be assigned as a value to every node 120-144 of the neural network 100. Here, $x_i^{(n)}$ denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 can comprise a weight being a real number, in particular, the weight is a real number within the interval $[-1, 1]$ or within the interval $[0, 1]$. Here, $w_{i,j}^{(m,n)}$ denotes the weight of the edge between the i-th node 120-138 of the m-th layer 110, 112 and the j-th node 132-144 of the n-th layer 112, 114. Furthermore, the abbreviation $w_{i,j}^{(n)}$ is defined for the weight $w_{i,j}^{(n,n+1)}$.

In particular, to calculate the output values of the neural network 100, the input values are propagated through the neural network. In particular, the values of the nodes 132-144 of the (n+1)-th layer 112, 114 can be calculated based on the values of the nodes 120-138 of the n-th layer 110, 112 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 can be calculated based on the values of the input layer 110 of the neural network and/or based on the values of a prior hidden layer, etc.

In order to set the values $w_{i,j}^{(m,n)}$ for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}^{\prime(n)} = w_{i,j}^{(n)} - \gamma \cdot \delta_j^{(n)} \cdot x_i^{(n)}$$

wherein $\gamma$ is a learning rate, and the numbers $\delta_j^{(n)}$ can be recursively calculated as $$\delta_j^{(n)} = \left(\sum_k \delta_k^{(n+1)} \cdot w_{j,k}^{(n+1)}\right) \cdot f^{\prime}\left(\sum_i x_i^{(n)} \cdot w_{i,j}^{(n)}\right)$$

based on $\delta_j^{(n+1)}$, if the (n+1)-th layer is not the output layer, and $$\delta_j^{(n)} = \left(x_k^{(n+1)} - t_j^{(n+1)}\right) \cdot f^{\prime}\left(\sum_i x_i^{(n)} \cdot w_{i,j}^{(n)}\right)$$

if the (n+1)-th layer is the output layer 114, wherein f' is the first derivative of the activation function, and $y_j^{(n+1)}$ is the comparison training value for the j-th node of the output layer 114.

In some embodiments, the neural network 100 is configured, or trained, to generate a next-state prediction. The neural network 100 can be configured to receive one or more inputs, such as a sequence unit $S_i$ and a feature set $F_i$ associated with a sequence at the current time step. The neural network 100 is configured to generate an output representing a next-best (or next most likely) state based on the current sequence unit $S_i$ and the feature set $F_i$. In some embodiments, the output of the neural network 100 is used to populate one or more portions of a user interface.

Figure 4:
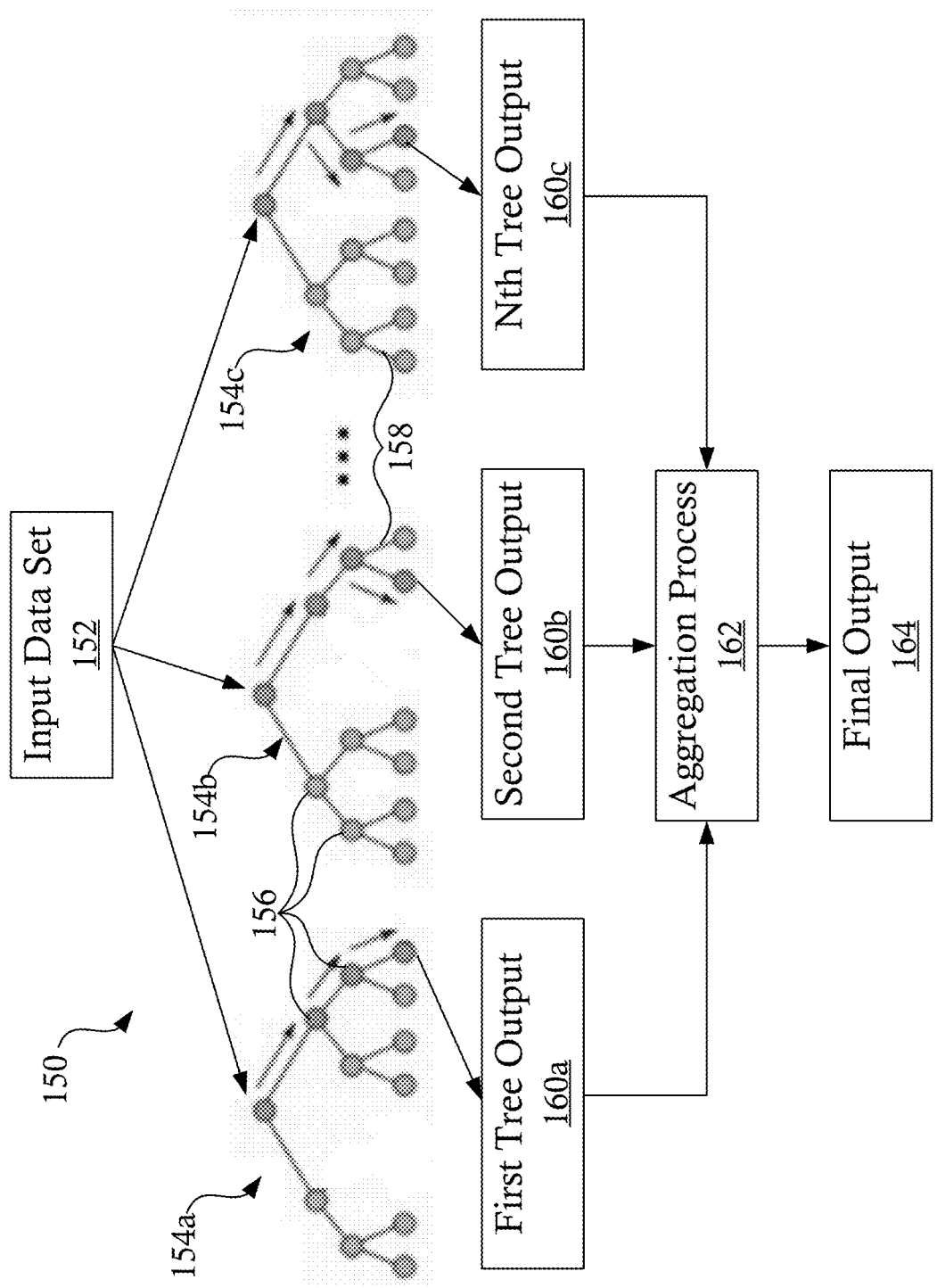
FIG. 4 illustrates a tree-based neural network, in accordance with some embodiments.

FIG. 4 illustrates a tree-based neural network 150, in accordance with some embodiments. In particular, the tree-based neural network 150 is a random forest neural network, though it will be appreciated that the discussion herein is applicable to other decision tree neural networks. The tree-based neural network 150 includes a plurality of trained decision trees 154a-154c each including a set of nodes 156 (also referred to as "leaves") and a set of edges 158 (also referred to as "branches").

Each of the trained decision trees 154a-154c can include a classification and/or a regression tree (CART). Classification trees include a tree model in which a target variable can take a discrete set of values, e.g., can be classified as one of a set of values. In classification trees, each leaf 156 represents class labels and each of the branches 158 represents conjunctions of features that connect the class labels. Regression trees include a tree model in which the target variable can take continuous values (e.g., a real number value).

In operation, an input data set 152 including one or more features or attributes is received. A subset of the input data set 152 is provided to each of the trained decision trees 154a-154c. The subset can include a portion of and/or all of the features or attributes included in the input data set 152. Each of the trained decision trees 154a-154c is trained to receive the subset of the input data set 152 and generate a tree output value 160a-160c, such as a classification or regression output. The individual tree output value 160a-160c is determined by traversing the trained decision trees 154a-154c to arrive at a final leaf (or node) 156.

In some embodiments, the tree-based neural network 150 applies an aggregation process 162 to combine the output of each of the trained decision trees 154a-154c into a final output 164. For example, in embodiments including classification trees, the tree-based neural network 150 can apply a majority-voting process to identify a classification selected by the majority of the trained decision trees 154a-154c. As another example, in embodiments including regression trees, the tree-based neural network 150 can apply an average, mean, and/or other mathematical process to generate a composite output of the trained decision trees. The final output 164 is provided as an output of the tree-based neural network 150.

In some embodiments, the tree-based neural network 150 is configured, or trained, to generate a next-state prediction. The tree-based neural network 150 can be configured to receive one or more inputs, such as a sequence unit $S_i$ and a feature set $F_i$ associated with a sequence at the current time step. The tree-based neural network 150 is configured to generate an output representing a next-best (or next most likely) state based on the current sequence unit $S_i$ and the feature set $F_i$. In some embodiments, the output of the tree-based neural network 150 is used to populate one or more portions of a user interface.

Figure 5:
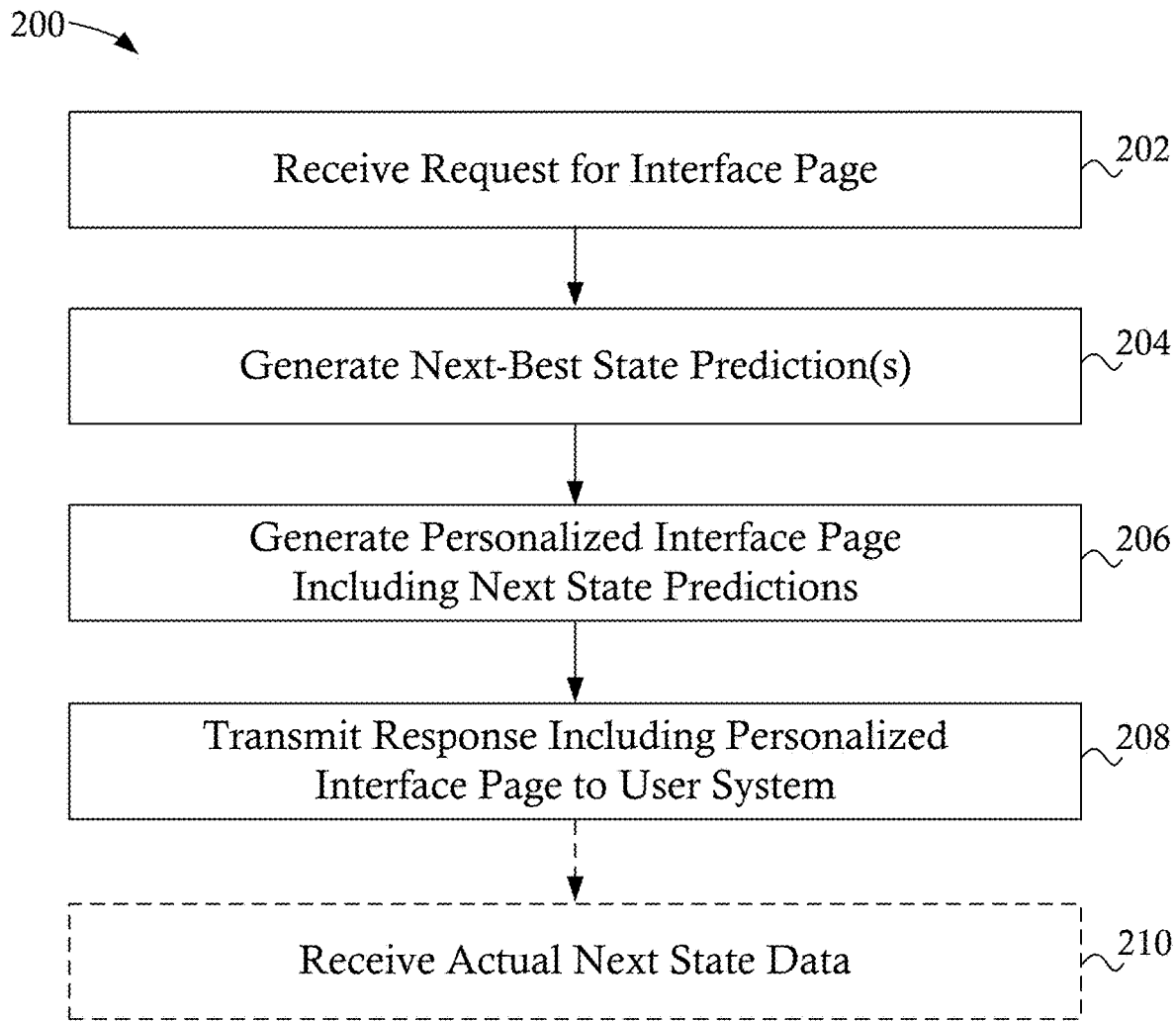
FIG. 5 is a flowchart illustrating a method of generating a network interface including one or more elements representing a predicted next-best state, in accordance with some embodiments.
Figure 6:
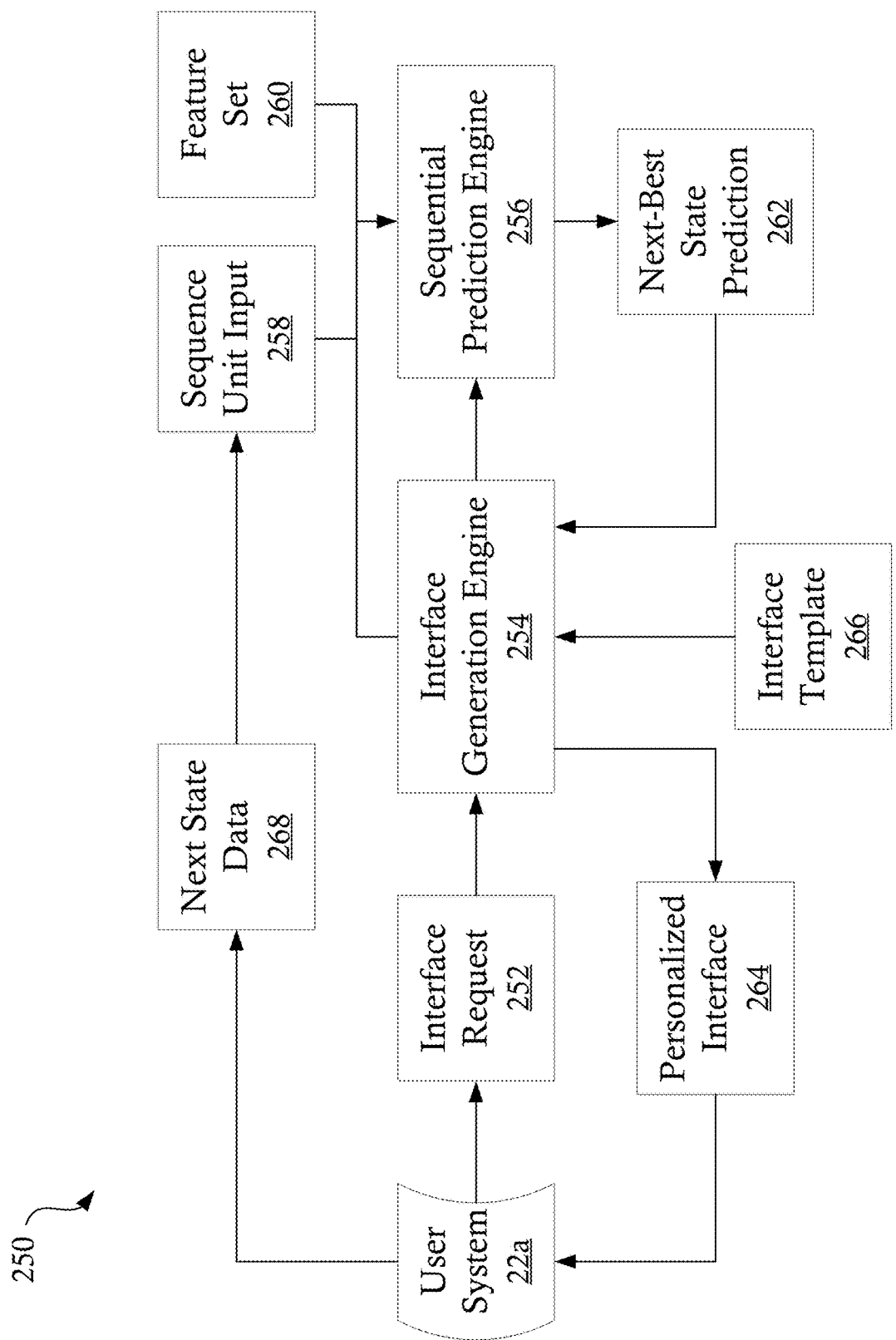
FIG. 6 is a process flow illustrating various steps of the method of generating a network interface including next-best state elements, in accordance with some embodiments.

FIG. 5 is a flowchart illustrating a method 200 of generating a network interface including one or more elements representing a predicted next-best state, in accordance with some embodiments. FIG. 6 is a process flow 250 illustrating various steps of the method 200 of generating a network interface including next-best state elements, in accordance with some embodiments. At step 202, an interface request 252 for an interface page is received by a system, such as the frontend system 24 via a communications interface. The request for the interface can be received from any suitable system, such as, for example, a user system 22a, 22b. The request can include one or more data elements identifying a user or profile associated with the requests and/or can include data elements identifying a prior sequence of states for user interactions with the network interface. For example, in various embodiments, a request can include data elements such as cookies and/or beacons. In some embodiments, one or more data elements can be retrieved from a database based on the request.

At step 204, a sequential prediction engine 256 receives a sequence unit input 258 and a set of features 260. The sequence unit input 258 can be included as part of the interface request 252 and/or obtained from a database based on one or more identifiers. For example, in some embodiments, an interface request 252 includes a user identifier associated with user interactions with a network interface. When the interface generation engine 254 receives the interface request 252, the interface generation engine 254 can obtain user sequence data from a database. Similarly, an interface request can include a set of features 260 associated with the sequence unit input 258 and/or a set of features 260 can be obtained from a database based on an identifier, such as a user identifier and/or a sequence unit identifier. The sequence unit input 258 and/or the set of features 260 can be provided to the sequential prediction engine 256 directly from the user system 22a, from the interface generation engine 254, loaded from a database, and/or otherwise acquired by the sequential prediction engine 256.

At step 206, the sequential prediction engine 256 generates a next-best state prediction 262. The next-best state prediction 262 identifies the next most likely next state for one or more elements and/or the interface as a whole given a current (or prior) state of the interface and one or more state features. In some embodiments, the sequential prediction engine 256 includes one or more sequential prediction models configured to generate the next-best state prediction 262. In some embodiments, the sequential prediction engine 256 is configured to generate a comprehensive next-best state prediction including multiple sub-state predictions. For example, in some embodiments, a next-best user intent state and a plurality of state elements can be predicted by the sequential prediction engine 256.

In various embodiments, the sequential prediction engine 256 can be configured to predict a next best action (e.g., next most likely action for a user), a next session shopping journey (e.g., a set of items likely to be viewed and/or interacted with during the next interaction with an interface), a user seasonal preference (e.g., the next likely seasonal category of interest to the user), a next best question (e.g., a next best data collection prompt), a next best user's intent prediction (e.g., a next likely user intent in interacting with the interface), and/or any other suitable next best state. The sequential prediction engine 256 can be configured to capture a user's dynamically evolving interest, e.g., based on current state transitions, while capturing overall user preferences, e.g., based on historical state transitions. In some embodiments, the sequential prediction engine 256 is configured to identify changing user preferences based on changing state transitions for a given sequence unit input.

In some embodiments, the sequential prediction engine 256 receives a sequence unit input 258 representative of a current and/or one or more prior states of a network interface. For example, when predicting a next page or intent state of a network interface, the sequence unit input 258 can represent a current and/or one or more most-recent states of the network interface for a user associated with the user system 22a that generated the interface request 252. As another example, when predicting a next item state (e.g., a next item to be added to a cart, viewed, etc.), the sequence unit input 258 can represent the N most recent item interactions for a user associated with the user system 22a that generated the interface request 252 (e.g., the N most recent items viewed, searched for, added to a cart, etc.). N can be any positive integer.

In some embodiments, the sequential prediction engine 256 receives a set of features 260 associated with a current state sequence at the current time interval, or step. For example, in various embodiments, the set of features 260 can include meta features associated with the type of sequence unit being provided, such as features associated with a current network interface, features associated with one or more items represented by the sequence unit, features associated with a current or prior transaction, features associated with the user, features regarding a current activity type, and/or any other suitable features.

At step 208, the next-best state prediction 262 is provided to the interface generation engine 254. The interface generation engine 254 is configured to generate personalized (e.g., user-specific/customized) interface 264. The personalized interface 264 can include one or more elements selected based on the next-best state prediction 262. In some embodiments, the interface generation engine 254 is configured to obtain an interface template 266 and populate the interface template 266 with one or more interface elements to generate a personalized interface 264. At least one of the interface elements can be selected to be representative of the next-best state prediction 262. For example, if the next-best state prediction 262 is indicative of a next likely interface page, the interface template 266 can be populated with one or more elements configured navigate a user to the next likely interface page. Similarly, if the next-best state prediction 262 is indicative of next likely action (e.g., add-to-cart, initiate return, etc.), the interface template 266 can be populated with one or more elements configured to execute the action. For example, if a next-best state prediction 262 indicates the next likely state is an add-to-cart state for one or more items, the interface template 266 can be populated with items likely to be added to the cart (e.g., items predicted by the next-best state prediction 262). It will be appreciated that any suitable elements can be added to an interface template 266 based on the next-best state prediction 262 to generate a personalized interface 264.

In some embodiments, a the interface generation engine 254 is configured to implement a whole interface personalization process based on the next-best state prediction 262. An interface template 266 can be selected and populated with elements exclusively related to one or more next-best predicted states. For example, if the next-best state prediction 262 indicates that the next state is related to an intent, such as grocery intent, return intent, etc., the interface template 266 can be populated with elements related to that intent, such as elements related exclusively to grocery, elements to facilitate a return, elements to facilitate sign-up or renewal of a loyalty program, etc. It will be appreciated that any suitable combination of interface and/or element personalization can be implemented to generate personalized interface 264.

In some embodiments, the sequential prediction engine 256 includes one or more sequential prediction models having an implemented sequential framework. For example, in some embodiments, one or more sequential prediction models can include a SASRec or TiSASRec framework. Although specific embodiments are discussed herein, it will be appreciated that any suitable recommendation framework, such as a sequential recommendation framework, stochastic recommendation framework, etc., including a self-attentive element can be configured to provide a next-best state prediction 262.

In some embodiments, the sequential prediction engine 256 is configured to receive a set of features 260 including one or more user features representative of user interactions with an interface, such as user interactions with prior states and/or elements presented in prior interactions with an interface generated by the frontend system 24. User-preference features can include, but are not limited to, the number of transactions feature (e.g., a feature representative of a number of transactions performed by a user in a predetermined time period (e.g., per month, per week, etc.)), a user affinity feature (e.g., a feature representative of a user affinity for portions of an interface such as grocery portion or a general merchandise portion of an e-commerce interface), a context affinity feature (e.g., a feature representative of a user affinity for a specific interface context), an inter-purchase interval feature (e.g., a feature representative of time between transactions), an items viewed feature (e.g., a feature representative of a number of items viewed in a predetermined time period or frequency of items viewed in a predetermined time period), an add-to-cart feature (e.g., a feature representative of a number of items added to a cart in a predetermined time period), a fulfillment intent feature (e.g., a feature representative of a fulfillment intent (e.g., pickup, delivery, etc.) for an order), and/or other suitable user-preference features. In some embodiments, the user-preference features are representative of a user understanding that includes, for example, user-level preference features such as a brand preference feature, a price preference feature, an intent feature (e.g., purchase intent, sell intent, etc.), and/or any other suitable user-level preference features.

At step 208, the personalized interface 264 (e.g., a response to the interface request 252 including the personalized interface 264) is provided to the user system 22a, 22b that initially transmitted the interface request 252. At optional step 210, actual next state data 268 is received, for example, from the user system 22a, 22b. The actual next state data 268 represents a next state that for the user interface after presentation of the personalized interface 264. For example, the actual next state data 268 can indicate that the next state of the user interface was the predicted state represented by the next-best state prediction 262, i.e., that the next state was accurately predicted. Alternatively, the actual next state data 268 can indicate that the next state was not the predicted state, i.e., that the next state was not accurately predicted. The received actual next state data 268 can be used to train (or retrain) one or more sequential prediction models.

In various embodiments, the disclosed method 200 can be applied for batch prediction (e.g., prediction of next best states at a time prior to state interactions) and/or in real-time (e.g., prediction of next best states for a current session based on current state information). In some embodiments, the sequential prediction engine 256 is configured to update user-state predictions based on in-session behavior, for example, monitoring current state transition journeys and predicting next-best state based on the current session state transitions.

Figure 7:
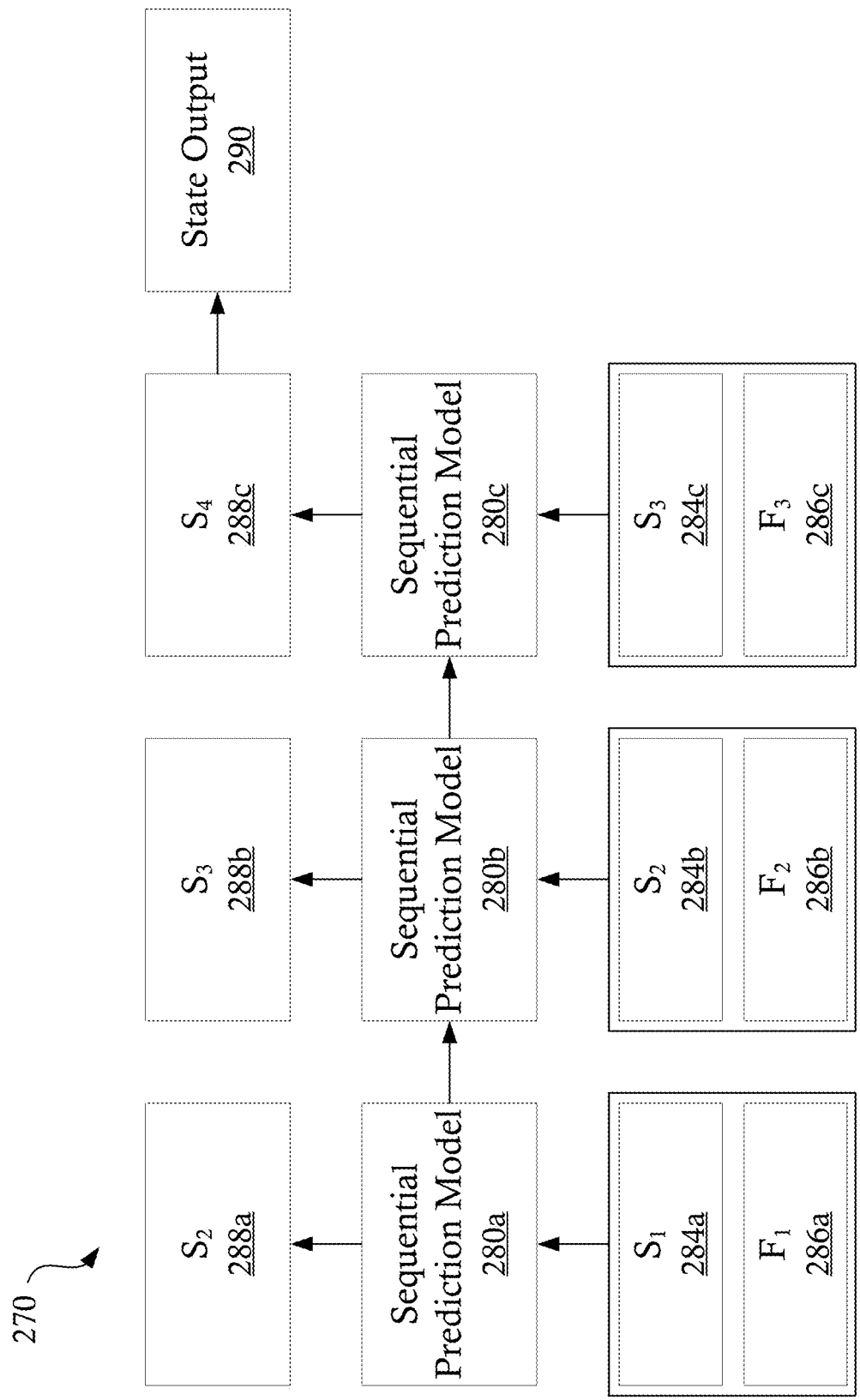
FIG. 7 illustrates a partial system diagram for a sequential prediction engine, in accordance with some embodiments.

FIG. 7 illustrates a partial system diagram 270 for a sequential prediction engine 254a, in accordance with some embodiments. The sequential prediction engine 254a includes a plurality of trained sequential prediction models 280a-280c. Each of the trained sequential prediction models 280a-280c is configured to receive a corresponding set of inputs 282a-282c including an initial, or prior, sequence unit 284a-284c (Sn) and a set of input features 286a-286c (Fn) related to the initial sequence unit 284a-284c. The set of trained sequential prediction models 280a-280c indicate a set of sequential time steps, or time periods, that have related sequential states. In some embodiments, the set of trained sequential prediction models 280a-280c are configured to generate sequential prediction outputs 288a-288c representative of expected next sequence units, or states, for each input initial sequence unit 284a-284c. The sequential prediction engine 256 can generate an predicted next state output 290 from an initial sequence unit input 284a based on intermediate sequence unit predictions.

For example, the first trained sequential prediction model 280a receives a first sequence unit $S_1$ as an initial state input 284a and a set of features $F_1$, which are related to and/or characterize elements of the first sequence unit $S_1$, as a set of input features 286a. The first trained sequential model 280a predicts a second state $S_2$ as the predicted next sequence unit 288a after the initial input sequence unit $S_1$. The second trained sequential prediction model 280b receives the second sequence unit $S_2$ as an initial state input 284a and a set of features $F_2$, related to and/or characterizing elements of the second sequence unit $S_2$, as a set of input features 286b. As shown in FIG. 7, in some embodiments, the second trained sequential prediction model 280b is configured to receive inputs directly from the first trained sequential prediction model 280a. The received inputs can include the output state $S_2$ of the first trained sequential prediction model 280a, one or more model parameters, and/or any other suitable input. The second trained prediction model 280b predicts a third sequence unit $S_3$ as the next state 288b after the second state $S_2$.

A third trained sequential prediction model 280c is configured to receive the third state $S_3$ as an initial sequence unit input 284c and a set of features $F_3$, related to and/or characterizing elements of the third state $S_3$, as an input set of features 286c. As shown in FIG. 7, in some embodiments, the third trained sequential prediction model 280c is configured to receive inputs directly from the second trained sequential prediction model 280b. The received inputs can include the output state $S_3$ of the second trained sequential prediction model 280b, one or more model parameters, and/or any other suitable input. The third trained prediction model 280c predicts a fourth sequence unit $S_4$ as the next state 288c after the third state $S_3$. The fourth sequence unit $S_4$ is provided as the final class output 290, e.g., the next expected state, for the set of sequential units $S_1$-$S_3$.

The sequential state prediction illustrated in FIG. 7 can include any suitable set of sequential units. For example, in various embodiments, the sequential units (e.g., states) $S_1$-$S_4$ can be representative of a product type (e.g., grocery, merchandise) preference, an interface journey (e.g., transitions between various interface pages), an accessory journey, and/or any other suitable set of state transitions. The sets of features $F_1$-$F_3$ are related to the type of state represented by the sequence units $S_1$-$S_3$. For example, in various embodiments, the sets of features 286a-286c can include meta features associated with each sequence unit, e.g., item features (e.g., high vs. low consideration, brand, attributes, categories, etc.) related to item sequence units, customer features (e.g., persona, preferences, prior history), related to customer state predictions, transaction features (e.g., GMV, quantity, etc.) related to transaction sequence units, activity features (e.g., transition, add-to-cart, view, etc.) related to activity sequence units, and/or any other suitable features.

Figure 8A:
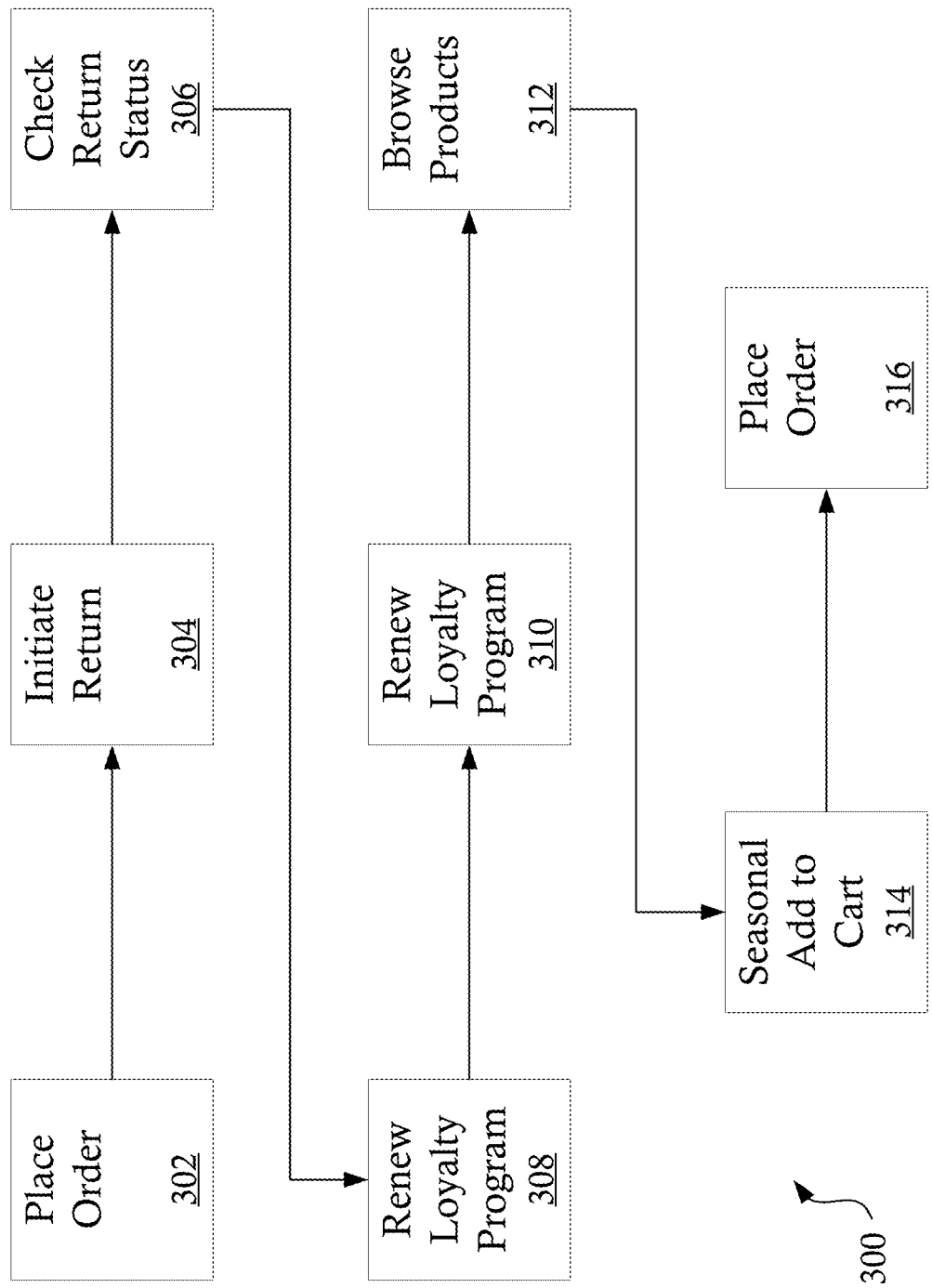
FIG. 8A illustrates an e-commerce action sequence including a set of sequence units representative of actions performed by a customer through an e-commerce network interface, in accordance with some embodiments.
Figure 8B:
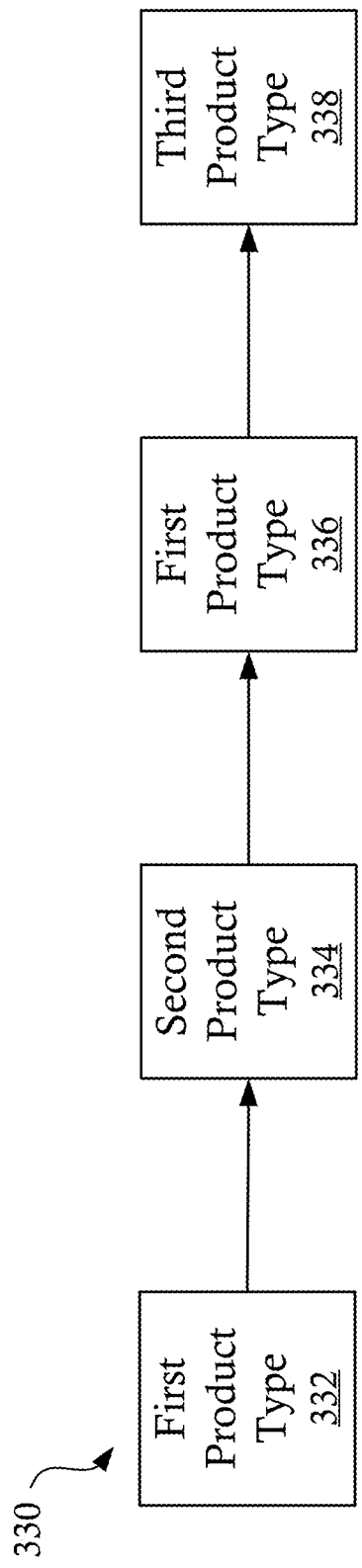
FIG. 8B illustrates an e-commerce item journey sequence, in accordance with some embodiments.
Figure 8C:
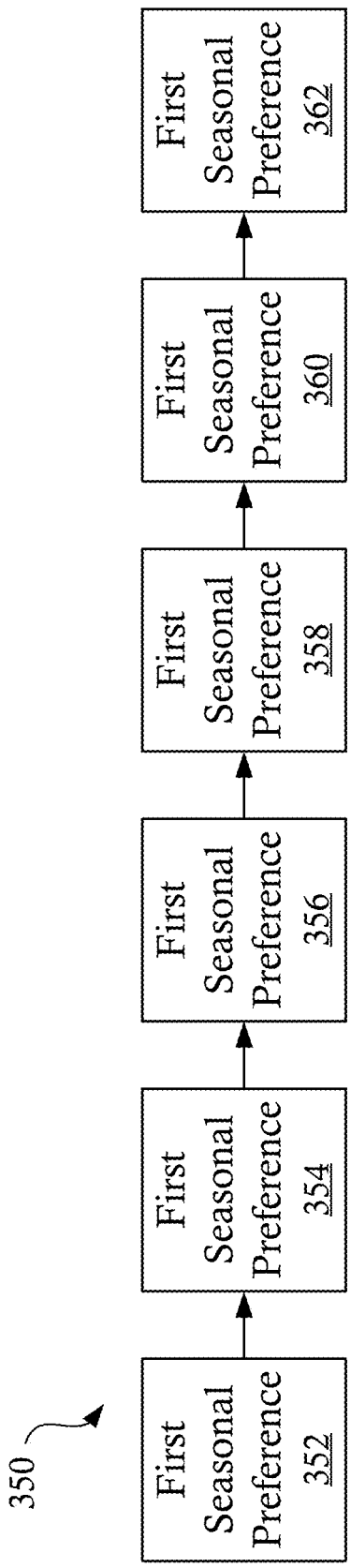
FIG. 8C illustrates a seasonal preference sequence including a set of sequence units representative of a customer's seasonal preferences throughout a predetermined time period, in accordance with some embodiments.

FIGS. 8A-8C illustrate sets of state transitions that can be provided as sequence units to a sequential prediction engine 256 for prediction of a next state, in accordance with some embodiments. For example, FIG. 8A illustrates an e-commerce action sequence 300a including a set of sequence units 302-314 representative of actions performed by a customer through an e-commerce network interface. For example, as shown in FIG. 8A, the e-commerce action sequence 300a can include a first sequence unit 302 representative of a place order action, a second sequence unit 304 representative of an initiate return process action, a third sequence unit 306 representative of a check return status action, a fourth sequence unit 308 representative of a renew loyalty program action, a fifth sequence unit 310 representative of a browse products action, a sixth sequence unit 312 representative of an add-to-cart action for seasonal products, and a seventh sequence unit 314 representative of a place order action. As illustrated in FIG. 8A, the browse products action represented by the fifth sequence unit 310 can include a feature 316 identifying a seasonal campaign associated with the fifth sequence unit 310. In some embodiments, a sequential prediction engine 256 can be configured to predict a next likely action for the user given the e-commerce action sequence.

As another example, FIG. 8B illustrates an e-commerce item journey sequence 330. The e-commerce item journey sequence 330 includes a set of sequence units 332-336 (e.g., states) representing browsing activity for a user within an e-commerce interface. The e-commerce item journey sequence 330 includes a first sequential unit 332 representative of a first product type, e.g., baby products, a second sequential unit 334 representative of a second product type, e.g., electronics, a third sequential unit 336 representative of the first product type, and a fourth sequential unit 338 representative of a third product type, e.g., home décor. In some embodiments, a sequential prediction engine 256 can be configured to predict a next likely product category given the e-commerce item journey sequence 330.

As yet another example, FIG. 8C illustrates a seasonal preference sequence 350 including a set of sequence units 352-362 representative of a customer's seasonal preferences throughout a predetermined time period. The seasonal preference sequence 350 includes a first sequence unit 352 representative of a first seasonal preference, e.g., Valentine's Day, a second sequence unit 354 representative of a second seasonal preference, e.g., Easter, a third sequence unit 356 representative of a third seasonal preference, e.g., Mother's Day, a fourth sequence unit 358 representative of a fourth seasonal preference, e.g., Father's Day, a fifth sequence unit 360 representative of a fifth seasonal preference, e.g., July $4^{th}$, and a sixth sequence unit 362 representative of a sixth seasonal preference, e.g., back-to-school. In some embodiments, a sequential prediction engine 256 can be configured to predict a next likely seasonal category given the seasonal preference sequence 350.

Although specific embodiments are illustrated herein, it will be appreciated that the illustrated sequences are provided solely for illustrative purposes. A sequential prediction engine 256 can be configured to predict any suitable type of state based on a suitable sequence set and related feature data. In some embodiments, a sequential prediction engine 256 can include multiple sequential prediction models, each configured to predict a different type of state for a network interface.

Figure 9:
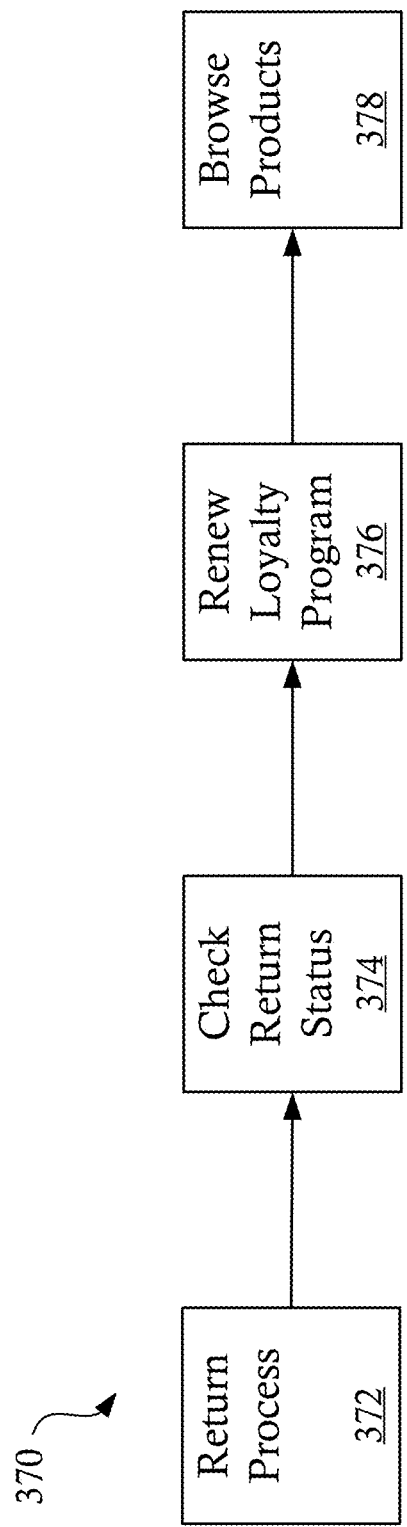
FIG. 9 illustrates a sequence set that can provided as sequence unit inputs to a sequential prediction engine for prediction of a comprehensive next state, in accordance with some embodiments.

In some embodiments, the sequential prediction engine 256 is configured to perform comprehensive next-best user state prediction that includes multiple predicted elements, such as, for example, a predicted intent, predicted item preferences, predicted pickup feature preference, and/or other predicted states related to the intent and/or content elements associated with the intent. FIG. 9 illustrates a sequence set 370 that can be provided as sequence unit inputs to a sequential prediction engine 256 for prediction of a comprehensive next state, in accordance with some embodiments. The sequence set 370 includes a first sequence unit 372 representative of an initiate return process action, a second sequence unit 374 representative of a check return status action, a third sequence unit 376 representative of a renew loyalty program action, and a fourth sequence unit 378 representative of a browse products action. In some embodiments, the sequence set 370 can be provided to a sequential prediction engine 256 including one or more sequence prediction engines configured to predict a next user intent and a plurality of features related to the predicted intent. For example, in some embodiments, the next predicted state can be a grocery intent (e.g., an intent to interact with a grocery portion of an e-commerce interface) and the predicted features can include a brand preference feature, a pickup preference feature, and/or any other suitable feature.

In some embodiments, one or more trained sequential prediction models are configured to provide comprehensive next-best user state predictions to provide one-to-one personalization of interfaces for each user. The trained sequential prediction models can be configured to receive historical and/or real-time feature inputs, allowing for predictions given user historical activity but allowing for changes based on a user's recent behavior to intents and/or assets within an intent.

Figure 10:
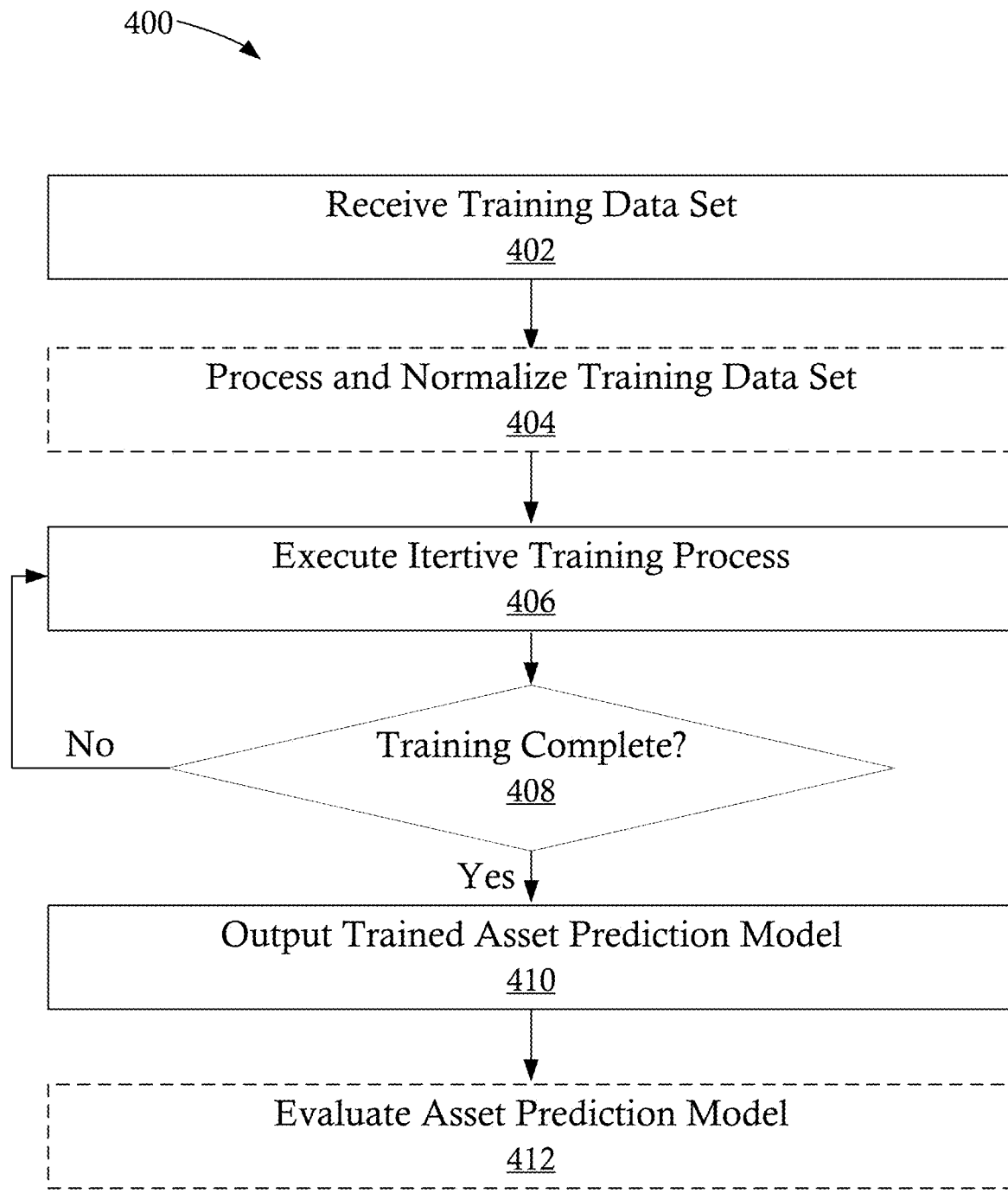
FIG. 10 illustrates a method for generating a trained state prediction model, in accordance with some embodiments.
Figure 11:
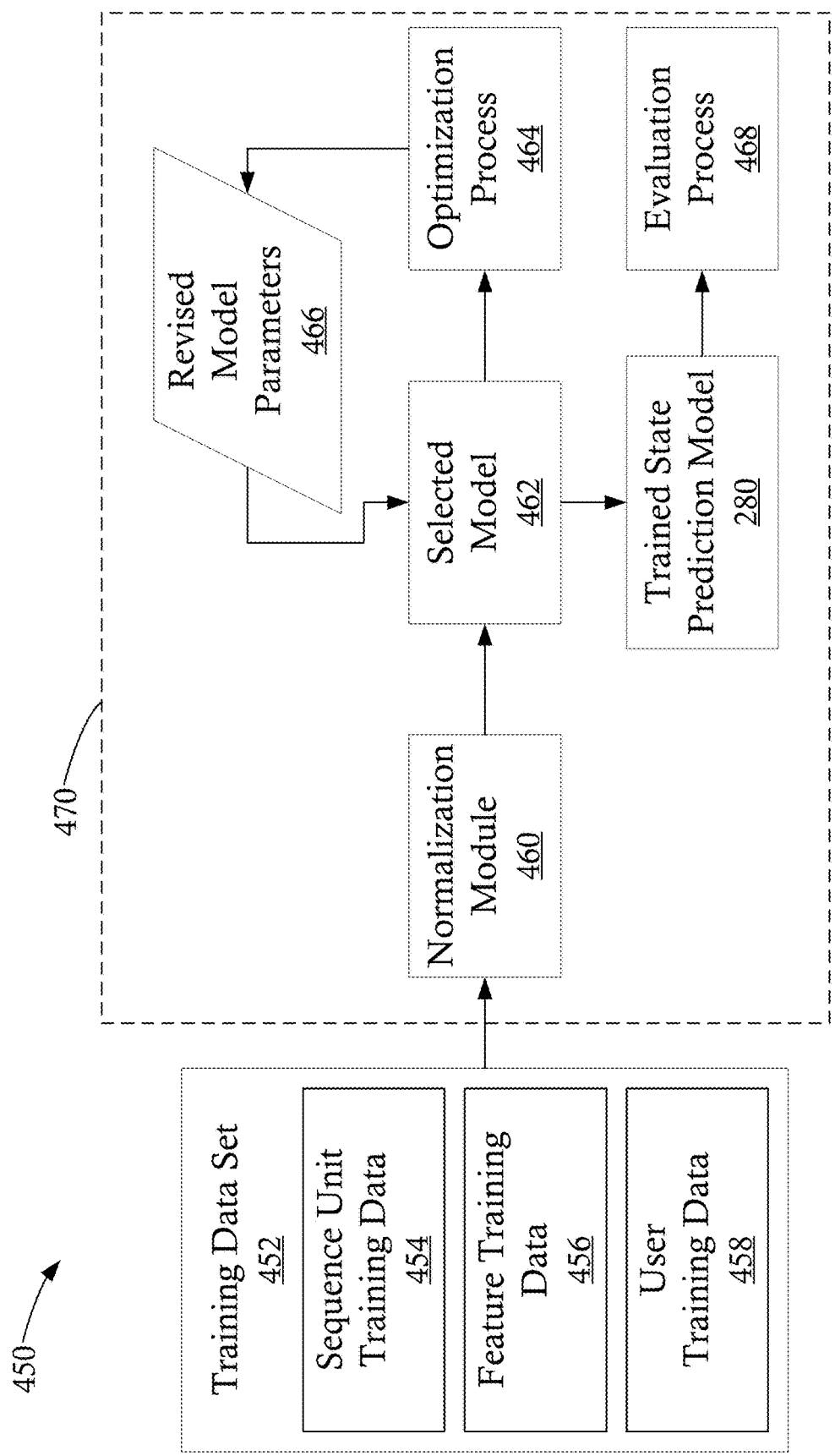
FIG. 11 is a process flow illustrating various steps of the method of generating a trained state prediction model of FIG. 10, in accordance with some embodiments.

In some embodiments, a trained sequential prediction model is generated using an iterative training process based on a training data set. FIG. 10 illustrates a method 400 for generating a trained sequential prediction model in accordance with some embodiments. FIG. 11 is a process flow 450 illustrating various steps of the method 400 of generating a trained sequential prediction model, in accordance with some embodiments. At step 402, a training data set 452 is received by a system, such as model training system 28. The training data set 452 can include labeled and/or unlabeled data, depending on the type of model and/or the type of training process being implemented. For example, when a supervised learning process is applied to train a SASRec or TiSASRec framework, the training data set 452 can include labeled data.

In some embodiments, the training data set 452 includes sequence unit training data 454. The sequence unit training data 454 can include data representative of sequential state changes for one or more users for a type of state, such as sequential state changes related to transitions through interface pages within a network interface, transitions for viewing, adding, or otherwise interacting with e-commerce items, transitions for enrolling in and/or renewing a loyalty program, etc. Sequential state changes can include a single state transition, i.e., a transition from a prior state to a next state, and/or can include a sequence of state changes, i.e., transitions from an initial state to a final state including one or more intermediate states.

In some embodiments, the training data set 452 includes feature training data 456 having one or more sets of features associated with one of the sequential state changes in the sequence unit training data 454. The feature training data 456 can include one or more features representative of a state and/or a state transition. For example, in various embodiments, the feature training data 456 can include features representative of an item, item property, transaction, transaction property, customer, customer property, activity type (e.g., add to cart, transition, view), category features, state-specific features, and/or any other suitable features.

In some embodiments, the training data set 452 includes user training data 458. The user training data 458 can include one or more user features representative of user interactions with an interface, such as user interactions with prior states and/or elements presented in prior interactions with an interface generated by the frontend system 24. User-preference features can include, but are not limited to, the number of transactions feature (e.g., a feature representative of a number of transactions performed by a user in a predetermined time period (e.g., per month, per week, etc.)), a user affinity feature (e.g., a feature representative of a user affinity for portions of an interface such as grocery portion or a general merchandise portion of an e-commerce interface), a context affinity feature (e.g., a feature representative of a user affinity for a specific interface context), an inter-purchase interval feature (e.g., a feature representative of time between transactions), an items viewed feature (e.g., a feature representative of a number of items viewed in a predetermined time period or frequency of items viewed in a predetermined time period), an add-to-cart feature (e.g., a feature representative of a number of items added to a cart in a predetermined time period), a fulfillment intent feature (e.g., a feature representative of a fulfillment intent (e.g., pickup, delivery, etc.) for an order), and/or other suitable user-preference features. In some embodiments, the user-preference features are representative of a user understanding that includes, for example, user-level preference features such as a brand preference feature, a price preference feature, an intent feature (e.g., purchase intent, sell intent, etc.), and/or any other suitable user-level preference features.

In some embodiments, the training data set 452 includes at least partially labeled training data such that the training data set 452 consists of input training data including at least a first portion of the sequence unit training data 454 representative of initial, intermediate, first, and/or prior states and the feature training data 456 and target, or output, training data including a portion of the sequence unit training data 454 representative of intermediate, second, and/or final states.

In some embodiments, the training data set 452 includes identifiers for obtaining features from pre-existing feature sets stored in one or more storage locations. For example, in some embodiments, the sequence unit training data 454 and/or the feature training data 456 can include a set of identifiers. Each of the identifiers can be used to retrieve sequence and/or feature data relevant to and/or associated with the identifiers from a database.

In some embodiments, the training data set 452 includes training data for a specific state type and is configured to generate a state prediction model for the specific state type. For example, in some embodiments, the training data set 452 can be limited to a specific context, such as interactions with specific portions or pages of an interface, specific actions, such as e-commerce interactions (e.g., add-to-cart, view, search, etc.), specific categories (e.g., loyalty program, grocery, etc.), and/or any other suitable specific type of state. State prediction models for specific state types are configured to generate a state predictions related only to the specific state type represented in the training data set 452.

In some embodiments, the received training data set 452 includes training data for a predetermined time period. For example, the training data set 452 can include sequence unit training data 454 limited to a predetermined time period including the last n days, weeks, months, etc. where n is a positive. As another example, in some embodiments, the training data set 452 can be limited to a predetermined time period defined by a set portion of a calendar year, for example, from the last n years for a period of time between a first month and a second month. Although specific embodiments are discussed herein, it will be appreciated that the predetermined time period of the training data set 452 can be selected to be any suitable time period.

At optional step 404, the received training data set 452 is processed and/or normalized by a normalization module 460. For example, in some embodiments, the training data set 452 can be augmented by imputing or estimating missing values of one or more features associated with a sequential state change. In some embodiments, processing of the received training data set 452 includes outlier detection configured to remove data likely to skew training of a state prediction model. In some embodiments, processing of the received training data set 452 includes removing features that have limited value with respect to training of the state prediction model.

At step 406, an iterative training process is executed to train a selected model 462. For example, a model training engine 470 can be configured to obtain a selected model 462 including an untrained (e.g., base) machine learning model, such as a SASRec framework or a TiSASRec framework, and/or a partially or previously trained model (e.g., a prior version of a trained state prediction model, a partially trained model from a prior iteration of a training process, etc.), from a model store, such as a model database 32. The model training engine 470 is configured to iteratively adjust parameters (e.g., hyperparameters) of the selected model 462 to minimize a cost value (e.g., an output of a cost function) for the selected model 462. In some embodiments, the cost value is related to the likelihood of a state transition from a prior state to a next state.

In some embodiments, the model training engine 470 implements an iterative training process that generates a set of revised model parameters 466 during each iteration. The set of revised model parameters 466 can be generated by applying an optimization process 464 to the cost function of the selected model 462. The optimization process 464 can be configured to reduce the cost value (e.g., reduce the output of the cost function) at each step by adjusting one or more parameters during each iteration of the training process.

After each iteration of the training process, at step 408, the model training engine 470 determines whether the training process is complete. The determination at step 408 can be based on any suitable parameters. For example, in some embodiments, a training process can complete after a predetermined number of iterations. As another example, in some embodiments, a training process can complete when it is determined that the cost function of the selected model 462 has reached a minimum, such as a local minimum and/or a global minimum.

At step 410, a trained state prediction model 280 is output and provided for use in an interface generation method, such as the method 200 discussed above with respect to FIGS. 5-6. The trained state prediction model 280 can include a general state prediction model and/or a specific state type prediction model. At optional step 412, a trained state prediction model 280 can be evaluated by an evaluation process 468 to determine the success rate of predicted state generated by the trained state prediction model 280. The trained state prediction model 280 can be evaluated based on any suitable metrics, such as, for example, impressions for predicted states, interactions with predicted states, scrolling behavior for an interface including predicted states, gross merchandise value (GMV) of products purchased through a predicted state, accuracy of predicted states, weighted or macro precision of predicted states, weighted or macro recall of predicted states, an F or F1 score of the state prediction model, normalized discounted cumulative gain (NDCG) of the state prediction model, mean reciprocal rank (MRR) of the predicted states, mean average precision (MAP) score of the state prediction model, and/or any other suitable evaluation metrics. In some embodiments, the trained state prediction model 258b is evaluated based on a limited set of evaluation metrics. For example, a trained state prediction model 280 can be evaluated based on weighted precision and recall, macro precision and recall, and an F-score. Although specific embodiments are discussed herein, it will be appreciated that any suitable set of evaluation metrics can be used to evaluate a trained state prediction model 280.

Figure 12:
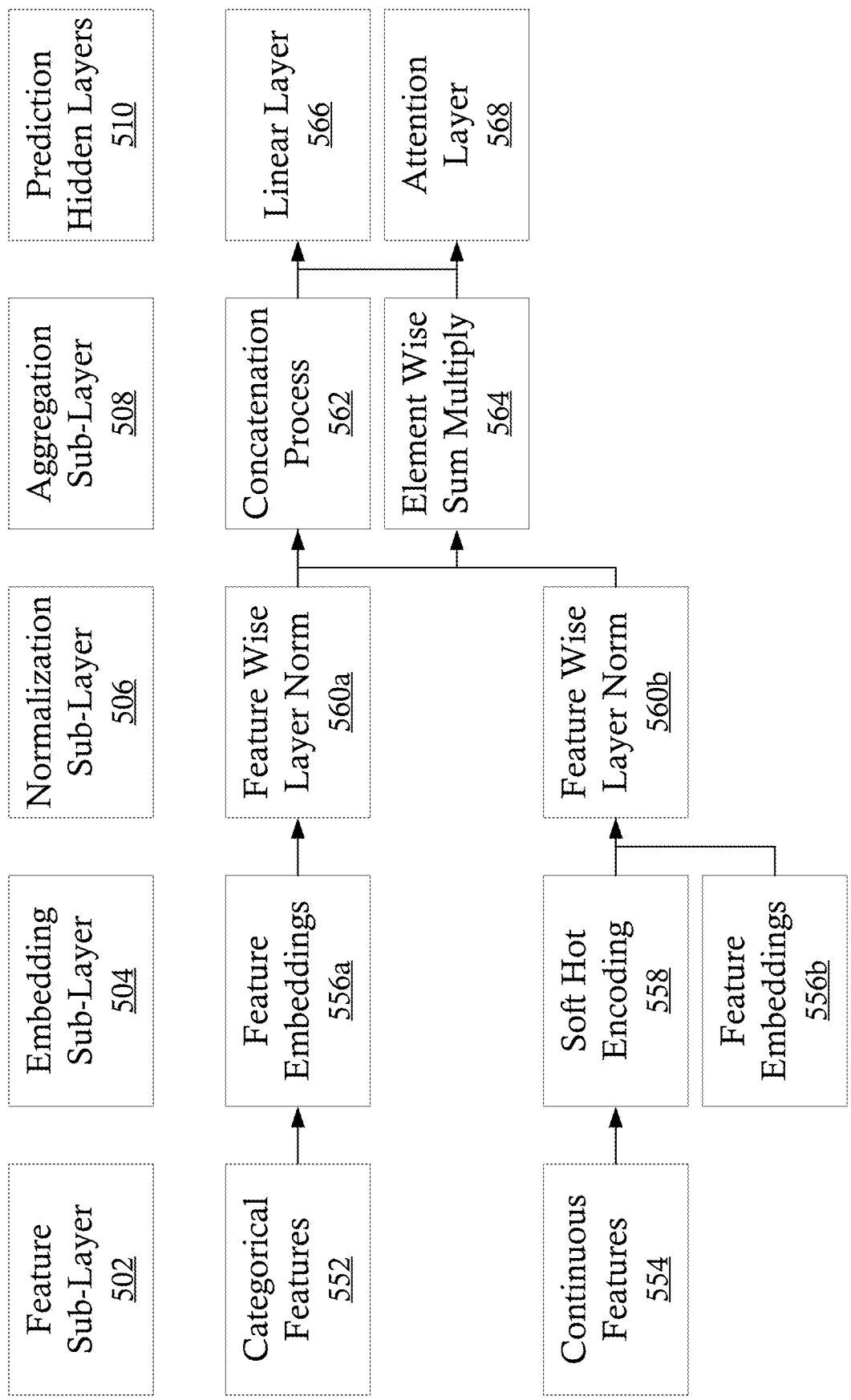
FIG. 12 illustrates a data layer process flow for a trained state prediction model, in accordance with some embodiments.

FIG. 12 illustrates a data layer process flow 500 for a trained state prediction model, in accordance with some embodiments. A trained state prediction model, such as a trained state prediction model, includes a feature layer 502 configured to receive one or more sets of features. The set of features can include, but are not limited to, categorical features 552 and continuous features 554. Each set of features 552, 554 is provided to a feature embedding layer 504 configured to convert a set of features 552, 554 into embeddings 556a, 556b (e.g., a lower-level vector representation of a higher-level input). The embeddings 556a, 556b can be generated using any suitable method, such as, for example, an autoencoder or a predictor.

In some embodiments, an encoding scheme, such as soft hot encoding, one-hot encoding, or soft encoding, can be applied to one or more of the input sets of features 552, 554. For example, in some embodiments, a soft hot encoding process 558 is applied to the continuous features 554 to generate encoded input data. The encoding scheme, such as a soft hot encoding scheme, can be configured to convert categorical data elements into numerical data suitable for use by a trained model, such as a trained state prediction model. In some embodiments, an applied encoding process converts categorical data into numerical data and subsequently splits the converted data into multiple elements suitable for use by a trained state prediction model.

After the embeddings 556a, 556b and/or the encodings are generated, a normalization layer 506 normalizes the embedding 556a, 556b and/or encoding features to generate feature-wise normalized inputs 560a, 560b. The normalized features are provided to a feature aggregation layer 508 configured to generate aggregated feature inputs by combining two or more of the normalized input features. For example, in various embodiments, the feature aggregation layer 508 can include a concatenation process 562 configured to concatenate two or more normalized features together. As another example, in various embodiments, the feature aggregation layer 508 can include an element wise sum multiply process 564 configured to perform various combinatorial operations, such as an element-based summation and/or multiplication, to generate aggregated feature inputs. Although embodiments are illustrated with aggregated feature inputs, it will be appreciated that a trained state prediction model can be configured to utilize non-aggregated feature inputs in addition to and/or instead of aggregated feature inputs.

The processed (e.g., converted, normalized, and/or aggregated) features are provided to a prediction layer 510. The prediction layer 510 includes a plurality of layers (e.g., hidden layers) configured to generate a next-state prediction based on the input features. In some embodiments, the prediction layer 510 can include multiple sub-layers, such as a linear layer 566 and/or an attention layer 568. In some embodiments, the linear layer 566 includes a constant size input and a constant size output, e.g., sub layer within the linear layer 566 is a linear combination of prior layers. In some embodiments, an attention layer 568 provides arbitrary sizing of inputs and outputs between layers. The output of the linear layer 566 and the attention layer 568 are converted into a next-state prediction, for example, by categorizing an output value into one of a set of potential next states.

Figure 13:
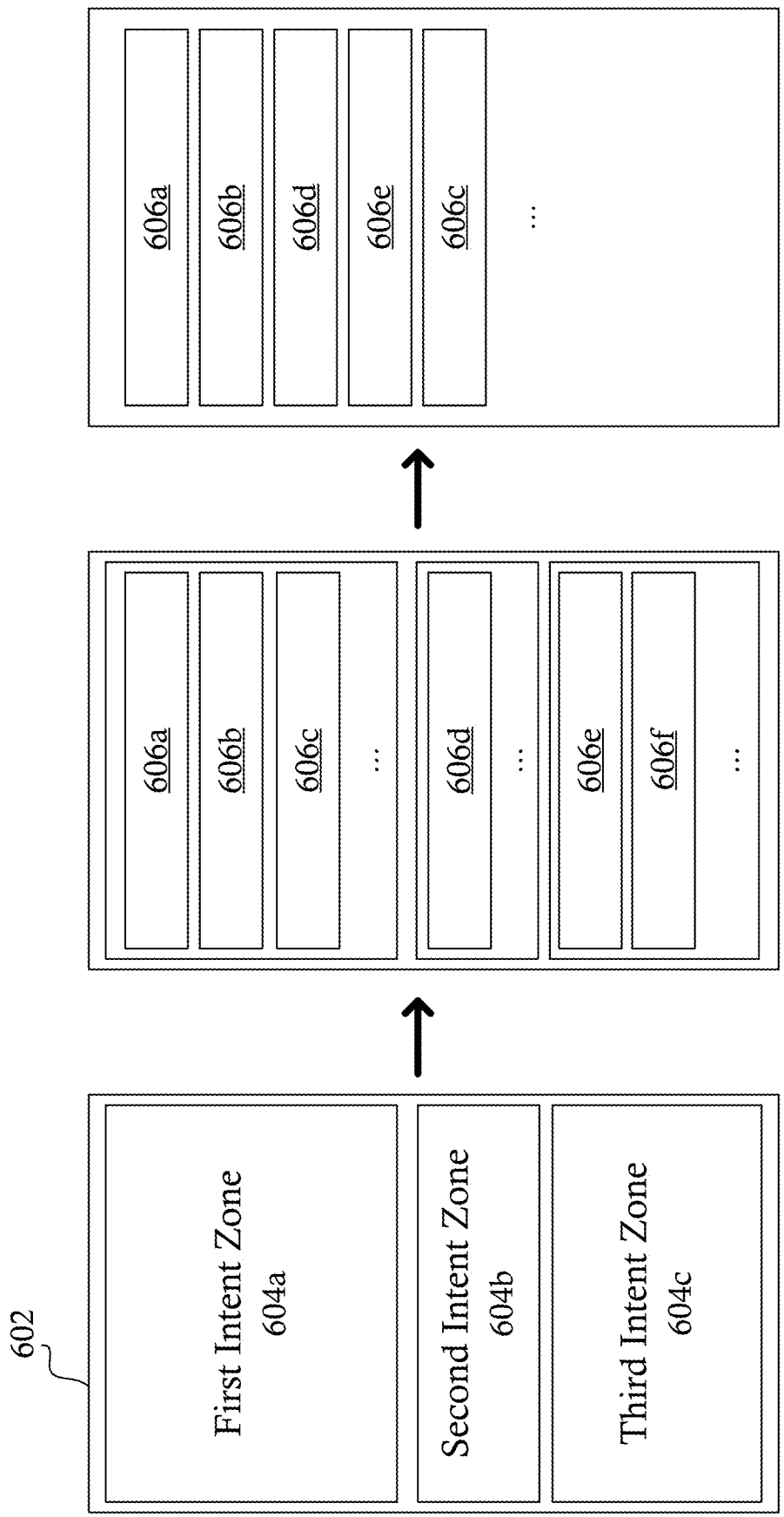
FIG. 13 illustrates an interface generation process flow including insertion of elements selected by a next best state prediction method, in accordance with some embodiments.

FIG. 13 illustrates an interface generation process flow 600 including insertion of elements selected by a next best state prediction method, in accordance with some embodiments. In some embodiments, the interface generation process flow 600 is configured to perform "whole page" personalization in which a generated interface page and each element on the page are selected by one or more next state prediction engines.

For example, in some embodiments, a default template 602 is selected including one or more intent zones 604a-604c configured to receive one or more types of content based on a user intent. A "user intent" can be defined as a state, where the next state, e.g., the next expected user intent, can be predicted based on prior states, e.g., prior user intents. In some embodiments, a first next state prediction model is configured to receive one or more prior intent states for a user and generate one or more next intent state predictions. For example, in one embodiment, the first next state prediction model can select, e.g., predict, a first intent type, such as "purchase low-consideration products," for a first intent zone 604a, a second intent type, such as "purchase high-consideration products," for a second intent zone 604b, and a third intent type, such as "purchase seasonal products," for a third intent zone 604c. Although specific embodiments are discussed herein, it will be appreciated that the predicted intent types can include any suitable intent for a network interface.

In some embodiments, after selecting the intent types for the intent zones 604a-604c, content elements 606a-606f can be selected for each of the intent zones 604a-604c. For example, for each of the intent zones 604a-604f, one or more content elements 606a-606f, such as one or more items for insertion into an item carousel, can be selected. In some embodiments, the content elements 606a-606f can be selected based on the intent type for each of the intent zones 604a-604c.

In some embodiments, the intent and/or potential content elements can be represented as a probability (P) where:

$$P(\text{intent}, pt \mid cid) = P(pt \mid cid, \text{intent}) * P(\text{intent} \mid cid)$$

where intent is the predicted intent, pt is a content element, and CID is a customer ID. Thus, in some embodiments, the probability of a specific intent and content element can be predicted for a given user based on the probability of the content element within the intent for that user and the probability of the intent for that user.

After identifying the various content elements 606a-606f for inclusion in the default template 602, the individual content elements 606a-606f can be ranked and presented in a personalized whole page interface 608. The content elements 608a-608f can be ranked using any suitable ranking mechanism, such as, for example, item ranking and re-ranking algorithms.

Although the subject matter has been described in terms of exemplary embodiments, it is not limited thereto. Rather, the appended claims should be construed broadly, to include other variants and embodiments, which can be made by those skilled in the art.

What is claimed is:

1. A system comprising:
a non-transitory memory;
a transceiver that receives a request for an interface including a user identifier, wherein the user identifier is stored in the non-transitory memory;
a next state prediction engine that:
receives a sequence unit set including at least one sequence unit associated with the user identifier, wherein the sequence unit is stored in the non-transitory memory;
receives a set of features associated with the at least one sequence unit in the sequence unit set; and
generates at least one predicted next state using a first trained sequential prediction model and a second trained sequential prediction model, wherein the first trained sequential prediction model receives the sequence unit set and the set of features for the at least one sequence unit and outputs at least one intermediate predicted next state for the sequence unit set, wherein the second trained sequential prediction model receives the at least one intermediate predicted next state and generates the at least one predicted next state for the sequence unit set, and wherein each of the at least one intermediate predicted next state and the at least one predicted next state each include a plurality of state elements associated therewith; and
an interface generation engine that:
generates an interface including at least one element related to the at least one predicted next state; and
transmits the interface to a user device associated with the user identifier.

2. The system of claim 1, wherein the first trained sequential prediction model comprises one of a SASRec model or a TiSASRec model.

3. The system of claim 1, wherein the sequence unit set comprises a set of sequence units representative of one or more prior intents associated with the user identifier.

4. The system of claim 1, wherein the first trained sequential prediction model comprises a soft hot encoding process.

5. The system of claim 1, wherein the first trained sequential prediction model comprises an aggregation layer including a concatenation process and an element wise sum multiply process.

6. The system of claim 1, wherein the first trained sequential prediction model comprises a linear layer and an attention layer.

7. The system of claim 1, wherein the set of features comprises at least one categorical feature and at least one continuous feature.

8. The system of claim 1, wherein the transceiver receives actual next state data indicating whether a next state of the interface was the at least one predicted next state, and wherein a model training engine trains an updated sequential prediction model based, in part, on the actual next state data.

9. A computer-implemented method, comprising:
receiving, via a transceiver, a request for an interface including a user identifier, wherein the user identifier is stored in non-transitory memory;
receiving, by a state prediction engine, a sequence unit set including at least one sequence unit associated with the user identifier, wherein the sequence unit is stored in the non-transitory memory;
receiving, by the state prediction engine, a set of features associated with the at least one sequence unit in the sequence unit set;
generating, by the state prediction engine, at least one predicted next state using a first trained sequential prediction model and a second trained sequential prediction model, wherein the first trained sequential prediction model receives the sequence unit set and the set of features for the at least one sequence unit and outputs at least one intermediate predicted next state for the sequence unit set, wherein the second trained sequential prediction model receives the at least on intermediate predicted next state and generates the at least one predicted next state for the sequence unit set, and wherein each of the at least one intermediate predicted next state and the at least one predicted next state each include a plurality of state elements associated therewith;
generating, by an interface generation engine, an interface including at least one element related to the at least one predicted next state; and
transmitting, via the transceiver, the interface to a user device associated with the user identifier.

10. The method of claim 9, wherein the first trained sequential prediction model comprises one of a SASRec model or a TiSASRec model.

11. The method of claim 9, wherein the sequence unit set comprises a set of sequence units representative of one or more prior intents associated with the user identifier.

12. The method of claim 9, wherein the first trained sequential prediction model comprises a soft hot encoding process.

13. The method of claim 9, wherein the first trained sequential prediction model comprises an aggregation layer including a concatenation process and an element wise sum multiply process.

14. The method of claim 9, wherein the first trained sequential prediction model comprises a linear layer and an attention layer.

15. The method of claim 9, wherein the set of features comprises at least one categorical feature and at least one continuous feature.

16. The method of claim 9, comprising:
receiving, via the transceiver, actual next state data indicating whether a next state of the interface was the at least one predicted next state; and
training, by a model training engine, an updated sequential prediction model based, in part, on the actual next state data.

17. A non-transitory computer readable medium having instructions stored thereon that, when executed by a processor, cause a device to perform operations comprising:
receiving, via a transceiver, a request for an interface including a user identifier, wherein the user identifier is stored in non-transitory memory;
receiving, by a state prediction engine, a sequence unit set including at least one sequence unit associated with the user identifier, wherein the sequence unit is stored in the non-transitory memory;
receiving, by the state prediction engine, a set of features associated with the at least one sequence unit in the sequence unit set;
generating, by the state prediction engine, at least one next state prediction using a first trained sequential prediction model and a second trained sequential prediction model, wherein the first trained sequential prediction model receives the sequence unit set and the set of features for the at least one sequence unit and outputs at least one intermediate predicted next state for the sequence unit set, wherein the second trained sequential prediction model receives the at least on intermediate predicted next state and generates at least one predicted next state for the sequence unit set, and wherein each of the at least one intermediate predicted next state and the at least one predicted next state each include a plurality of state elements associated therewith;
generating, by an interface generation engine, an interface including at least one element related to the at least one predicted next state; and
transmitting, via the transceiver, the interface to a user device associated with the user identifier.

\* \* \* \* \*